Aug. 10, 1943.  W. L. KRAEMER  2,326,231
WINDOW CLEANING APPARATUS
Filed May 17, 1941   3 Sheets-Sheet 1

INVENTOR
WALDO L. KRAEMER.
BY
ATTORNEY

Aug. 10, 1943.                W. L. KRAEMER                    2,326,231
                          WINDOW CLEANING APPARATUS
                             Filed May 17, 1941              3 Sheets-Sheet 2
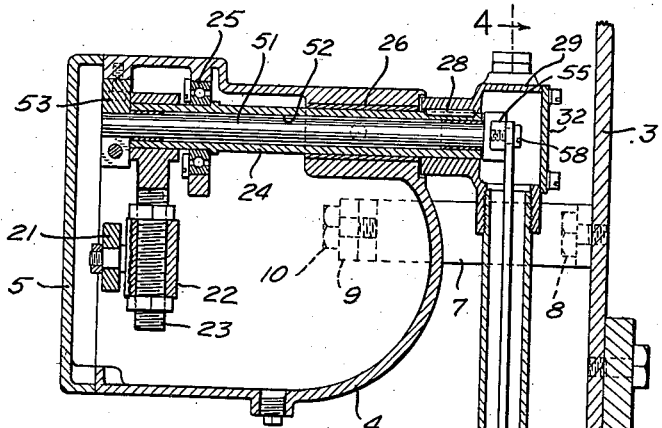
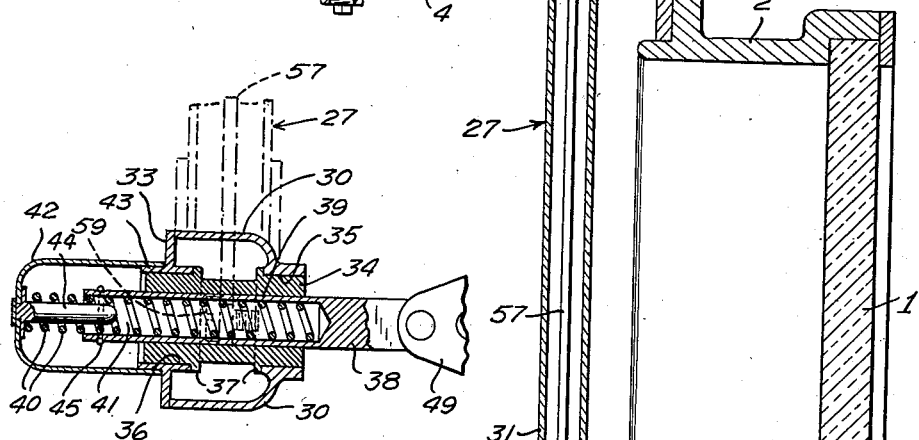
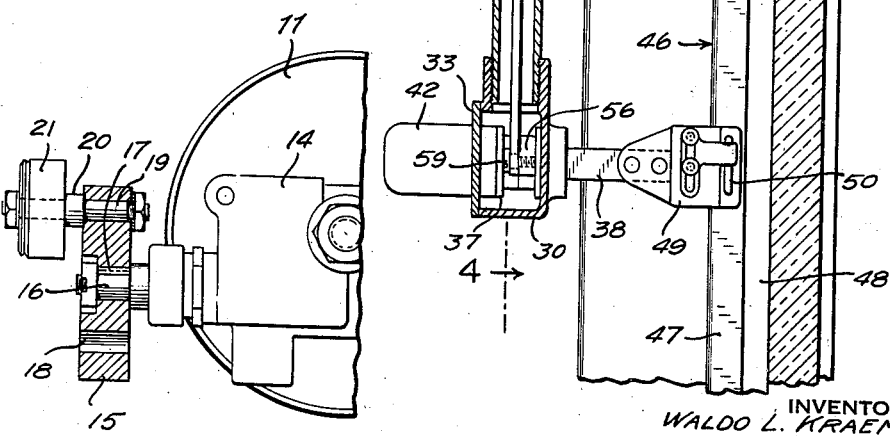
INVENTOR
WALDO L. KRAEMER
BY
ATTORNEY Patented Aug. 10, 1943

2,326,231

UNITED STATES PATENT OFFICE 2,326,231

WINDOW CLEANING APPARATUS

Waldo L. Kraemer, Brooklyn, N. Y., assignor to Kearfott Engineering Co., Inc., a corporation of New York Application May 17, 1941, Serial No. 393,884

4 Claims. (Cl. 15—253)

This invention relates generally to apparatus for removing rain, snow, sleet or any other sight obstructing matter from the windshields of automobiles or the lookout windows of ships, street cars, busses and the like.

It is specifically directed to window cleansing apparatus of the oscillating or pendulum type wherein a window wiper is resiliently pressed into engagement with a window and is moved back and forth across the window by an oscillating wiper arm which is operated by any suitable means, preferably an electric motor, suitably connected to the upper end of the wiper arm.

The principal object of the invention is to provide means, in combination with apparatus of this character, which is operatively connected to the wiper and is so constructed and arranged as to effect a cleaning of a greater area by the oscillation of the wiper arm, than is possible with such apparatus heretofore obtainable.

Another object of the invention is the provision of a device of this character which is enclosed within and is operated by the oscillation of the wiper arm.

Still another object is the provision of a device of this character that is of simple construction so as to be easily and cheaply manufactured and maintained, and yet one which is very efficient in operation.

Other and more limited objects will be apparent from the following specification and the accompanying drawings forming a part thereof wherein:

Fig. 3 is a central vertical section taken on the line 3—3 of Fig. 2;

Fig. 5 is a detail sectional view taken on the line 5—5 of Fig. 2; and

Fig. 6 is a detail sectional view taken on the line 6—6 of Fig. 2.

Figure 1:
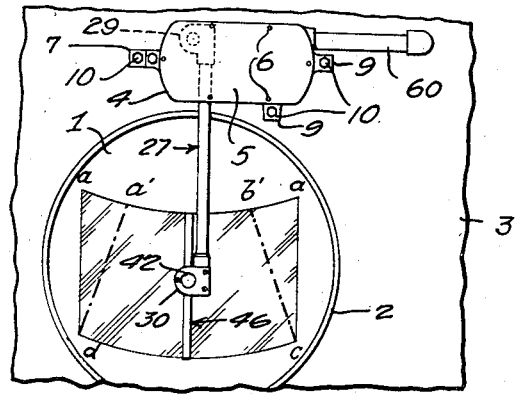
Fig. 1 is a diagrammatic front elevation of my device on a small scale, showing the area cleaned by my improved device in comparison with that cleaned by other devices of this general type.

My invention as illustrated herein is shown as applied to one of the lookout windows of a ship's pilot-house, and consists generally of a power operated oscillatory wiper arm which has operatively secured to its lower end a wiper blade which is resiliently pressed into engagement with a window and is moved back and forth across the surface thereof by the wiper arm as it is oscillated; and mechanism, operatively connected to the wiper blade and operated by the oscillation of the wiper arm, which always maintains the wiper blade parallel to its initial position as it is moved back and forth across the surface of the window. Window cleaners comprising a power operated oscillatory wiper arm which carries a wiper blade at its free end in contact with a window, and moves it back and forth across the surface of a window as it is oscillated, are old and well known in the art, and as such form no part of this invention. However the combination of such a cleaning apparatus and mechanism for maintaining the wiper blade parallel to its initial position as it is moved back and forth, is believed to be novel. The particular construction of such apparatus, and the manner of securing the wiper blade to the free end of the oscillatory wiper arm for resilient engagement with a window, are also believed to be novel.

Referring to the drawings by reference characters, the numeral 1 indicates a glass window which is suitably secured in a frame 2 which in turn is mounted in an opening in the wall 3 of a ship's pilot-house. A housing 4 having a removable cover 5 secured to the open side thereof by screws 6, is fastened to the outer surface of the wall 3 above the frame 2 by brackets 7, which are attached at one end to the wall 3 by bolts 8 and at their other ends to outwardly projecting lugs 9 on the housing 4 by bolts 10. A motor 11, having a reduction gearing operatively connected to the armature shaft thereof, is fastened by screws 13 within the housing 4. The reduction gearing is enclosed within a casing 14 which is formed integral with and projects outwardly from the motor casing. A crank disc 15 is keyed on the outer end of the power shaft 16 of the reduction gearing as indicated at 17.

The crank disc 15 has a plurality of bores 18 therethrough, arranged spirally around the center of the disc, which are adapted to receive the reduced end 19 of a stud 20. The disc 15 and the stud 20 constitute a crank, the throw of which may be increased or decreased by the proper selection of the bore 18 in which to secure the stud 20.

A connecting rod 21 has one end thereof rotatably secured upon the stud 20 and the other end thereof pivotally connected to a drive trunnion 22 which is screwed upon a drive lever 23 rigidly fastened to one end of a hollow rockshaft 24.

The rock-shaft 24 is rotatably supported by a ball bearing 25 and a bushing 26 in the upper part of the housing 4 near one end thereof, and projects out beyond the rear of the housing toward the wall 3. It will be readily seen from the foregoing construction that the rock-shaft 24 will be rocked back and forth when the crank disc 15 is rotated by the motor 11 through the reduction gearing within the housing 14 and the power shaft 16. The angle through which the rock-shaft is rocked may be varied by the changing of the stud 20 from one bore 18 to another, or by changing the position of the trunnion 22 upon the drive lever 23, or by a combination of both of these adjustments.

A wiper arm generally indicated by the numeral 27 which is keyed to the projecting end of the rock-shaft 24 as indicated at 28 is oscillated back and forth, with a pendulum movement, by the rock-shaft 24 as it is rocked by the mechanism just described. This wiper 27 consists of an enlarged hollow head 29 and an enlarged hollow foot 30 connected together by a tube 31. The head 29 is enclosed by a removable cap 32 and the foot 30 has a cover 33 removably secured over the open face thereof.

A sleeve 34 is rotatably supported in aligned bores 35 and 36 in the rear wall of the foot 30 and the cover 33 respectively, and is restrained from endwise movement by peripheral shoulders 37. A squared rod 38 is slidably supported within a complementary bore 39 in the sleeve 34, and is biased in one direction by a coiled spring 40 which is received in a bore 41 in the forward end of the rod 38 and bears at its opposite end against the inner face of a cap 42 suitably secured upon an outwardly extending cylindrical projection 43 on the forward face of the cover 33. The forward end of the spring 40 is positioned by an inwardly projecting lug 44 secured to the cap 42. The rearward movement of the rod 38 under the influence of the spring 40 is limited by a spring clip 45 received in an annular groove near the forward end of the rod 38. A wiper blade 46 which consists of a metal sheath 47 and a wiper 48 of rubber or other suitable material is secured to the rear end of the rod 38 by a clevis 49 and clevis staple 50. When the device as a whole is properly secured to the wall 3 with respect to the window 1 the wiper blade will be resiliently pressed into engagement with the window 1 and will be moved back and forth across the surface thereof as the wiper arm 27 is oscillated by the rock-shaft 24, and in this manner wipe off or remove any rain, snow or other sight obstructing matter collecting upon the surface of the window engaged by the wiper as it is moved back and forth.

In all previous window cleaning devices of this general type of which I have knowledge the wiper blade is always maintained in the same angular relation with respect to the wiper arm as it is moved back and forth by the oscillation of the wiper arm. Such a device applied to the window 1 as shown herein would maintain clean the area bounded by the lines $a'—b'$, $b'—c$, $c—d$ and $d—a'$ shown in Fig. 1.

My improved cleaner, as previously stated, includes mechanism which always maintains the wiper blade parallel to its initial position as it is moved back and forth so that it will maintain clean an area bounded by the lines $a—b$, $b—c$, $c—d$ and $d—a$ shown in Fig. 1. By comparing the area cleaned by previous cleaners of this type with the area cleaned by my improved cleaner, as shown in Fig. 1, it will be seen that the area cleaned by my cleaner is greater than that cleaned by previous cleaners by twice the area bounded by the lines $a—a'$, $a'—d$ and $d—a$.

Figure 2:
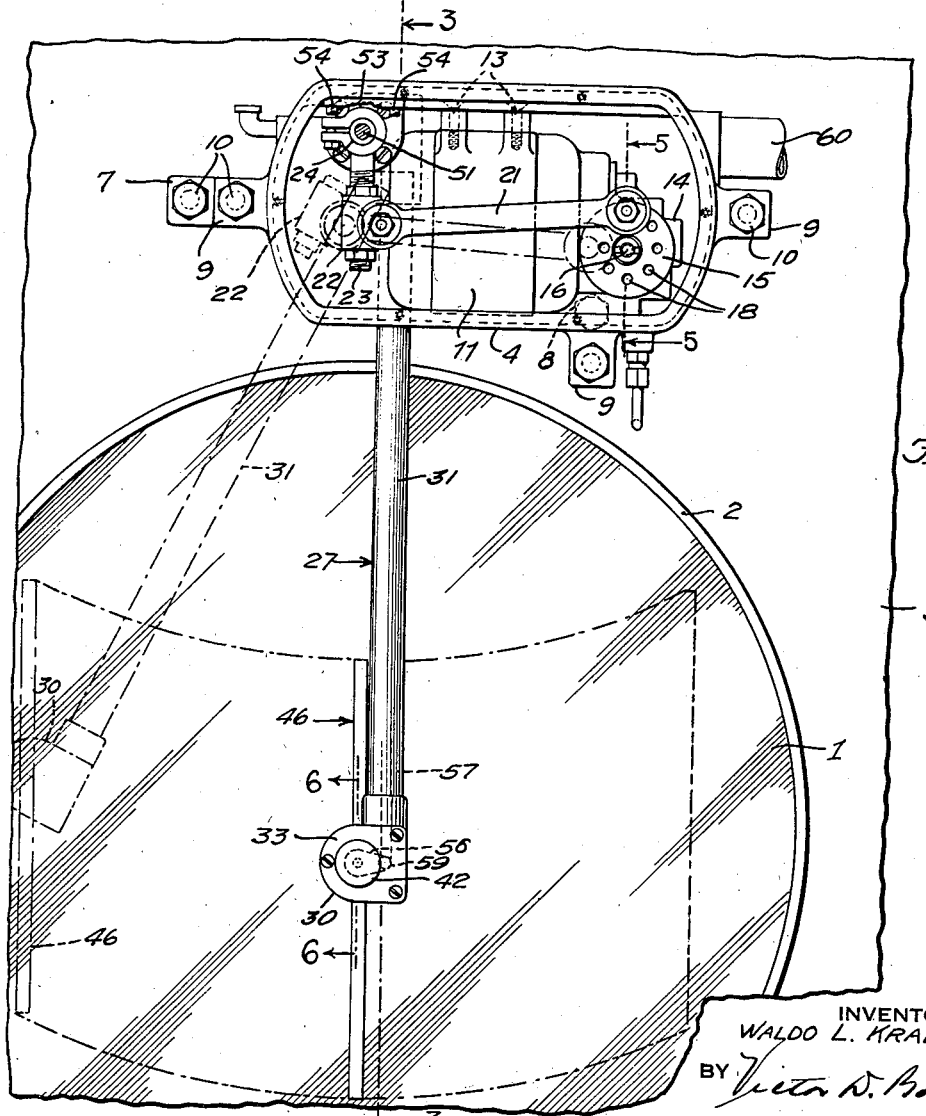
Fig. 2 is a front elevation of my device, with the cover plate of the housing removed, drawn on a somewhat larger scale than the scale of Fig. 1.
Figure 4:
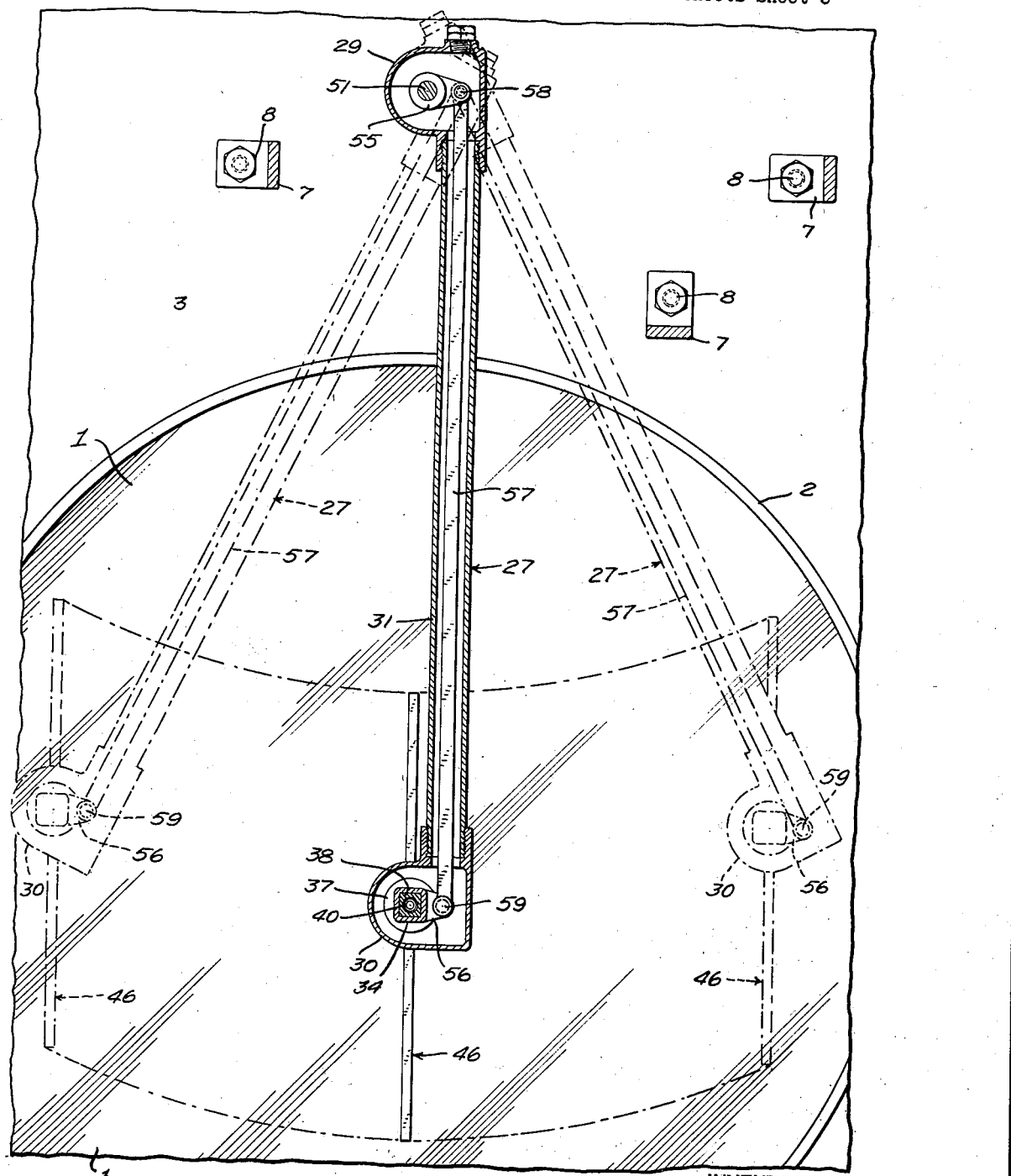
Fig. 4 is a central vertical sectional view taken through the wiper arm in the plane indicated by the line 4—4 of Fig. 3 and illustrating the manner in which the mechanism operates to maintain the wiper plate always parallel to its initial position as it is moved back and forth by the oscillation of the wiper arm.

This mechanism will now be described: A rod 51 is positioned within the bore 52 of the hollow rock-shaft 24 and is restrained from both rotary and longitudinal movement by being clamped between the jaws of a clevis 53 secured within the housing 4 to the inner face of the upper wall thereof by bolts 54. An outwardly extending arm 55 is rigidly secured to the rear end of the rod 51 beyond the projecting end of the rock-shaft 24 within the head 29. A crank-arm 56 is formed integral with and extends outwardly from one side of the sleeve 34 within the foot 30. The outer ends of the arm 55 and the crank-arm 56 are connected by a link 57 which is pivotally connected to the arm 55 at 58 and to the crank-arm 56 at 59. The link 57 extends between the arm 55 and crank-arm 56 within the tube 31 as is clearly shown in Figs. 2 and 4. The distance between the center of the pivot 58 and the center of the rod 51 and consequently the rock-shaft 24 is exactly the same as the distance between the center of the pivot 59 and the center of rotation of the sleeve 34; and the distance between the centers of the pivots 58 and 59 is exactly the same as the distance between the center of the rock-shaft 24 and the center of rotation of the sleeve 34. With this construction, arrangement, and relative proportion of the various parts, it will be readily seen by referring to Fig. 4, that the crank-arm 56 will always be maintained parallel to the fixed arm 55 as the wiper arm 27 is oscillated. It will also be apparent that the wiper blade 46 which is fixed with respect to the crank-arm 56 will always be maintained parallel to any assumed initial position as it is moved back and forth by the oscillation of the wiper arm 27.

The current for operating the motor 11 is delivered to the motor from any suitable source through wires enclosed in a conduit 60, and is controlled by a suitable switch not shown.

It will be understood that various modifications can be made in the construction of my window cleaning device as illustrated and described herein without departing from the scope of the invention as pointed out in the following claims.

I claim:

1. In a window cleaning apparatus, the combination of an oscillatory arm and means for oscillating said arm connected to one end thereof, a sleeve rotatably supported in the free end of said arm, a member slidably but nonrotatably supported in the bore of said sleeve, a wiper secured to one end of said member, spring means biasing said member in one direction whereby said wiper is resiliently pressed into engagement with a window, and means for maintaining said wiper parallel to its initial position while it is being moved back and forth by the oscillation of said arm, said last mentioned means comprising a crank-arm rigidly secured to said sleeve and a link having one end pivotally connected to a fixed member and having its other end pivotally connected to the free ends of said crank-arm.

2. In a window cleaning apparatus, the combination of a hollow rock-shaft and means for rocking said shaft, a stationary rod extending through the bore in said hollow rock-shaft, a hollow oscillatory arm rigidly connected at one end to the outer end of said rock-shaft, a sleeve rotatably supported in the free end of said oscillatory arm, a window engaging wiper operatively connected to said sleeve, and means for maintaining said wiper parallel to its initial position as it is moved back and forth by the oscillation of said oscillatory arm, said last mentioned means comprising a fixed arm within said hollow oscillatory arm rigidly connected to said stationary rod, a crank-arm within said hollow oscillatory arm rigidly connected to said sleeve, and a link within said oscillatory arm, said link having one end pivotally connected to the free end of said fixed arm and the other end pivotally connected to the free end of said crank-arm.

3. In a window cleaning apparatus, the combination of a hollow oscillatory wiper arm forming a closed housing, power operated means connected to one end of said wiper arm for oscillating said arm, a wiper blade holder rotatably supported by said arm at the free end thereof, a wiper blade adapted to engage a window and be moved back and forth across the surface thereof by the oscillation of said arm secured to said wiper blade holder, and means for maintaining said wiper blade parallel to its initial position while it is being moved back and forth, said means being entirely enclosed within said hollow wiper arm and comprising a crank arm rigidly connected to said wiper blade holder and extending outwardly therefrom in a plane perpendicular to the axis of said wiper blade holder, and a link having one end thereof pivotally connected to a fixed member and having its other end pivotally connected to the free end of said crank arm.

4. In a window cleaning apparatus, the combination of a wiper blade, means including a hollow oscillating arm forming a closed housing for holding said wiper blade in engagement with a window and for moving said blade back and forth across the surface thereof, and means for maintaining said wiper blade parallel to its initial position while it is being moved back and forth, said last mentioned means being entirely enclosed within said hollow oscillating arm and comprising a wiper blade holder rotatably supported in the free end of said oscillating arm, a crank arm rigidly secured to said wiper blade holder, and a link having one end pivotally connected to a fixed member and having its other end pivotally connected to the free end of said crank arm.

WALDO L. KRAEMER.